(12) United States Patent
Kothapally et al.

(10) Patent No.: US 11,972,267 B2
(45) Date of Patent: Apr. 30, 2024

(54) HIBERNATION OF COMPUTING DEVICE WITH FAULTY BATTERIES

(71) Applicant: INTERNATIONAL BUSINESS MACHINES CORPORATION, Armonk, NY (US)

(72) Inventors: Madhu Pavan Kothapally, Warangal (IN); Rajesh Kumar Pirati, Guntur (IN); Bharath Sakthivel, Theni (IN); Sarika Sinha, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 17/959,581

(22) Filed: Oct. 4, 2022

(65) Prior Publication Data

US 2024/0111546 A1 Apr. 4, 2024

(51) Int. Cl.
*G06F 9/4401* (2018.01)
*G06F 1/3212* (2019.01)

(52) U.S. Cl.
CPC .......... *G06F 9/4418* (2013.01); *G06F 1/3212* (2013.01)

(58) Field of Classification Search
CPC ...... G06F 1/329; G06F 9/5094; G06F 9/4418; G06F 1/3212
See application file for complete search history.

(56) References Cited

U.S. PATENT DOCUMENTS

| | | | |
|---|---|---|---|
| 8,271,054 B2 | 9/2012 | Bockus et al. | |
| 9,274,807 B2 | 3/2016 | Shiplacoff et al. | |
| 9,785,481 B2 * | 10/2017 | Muckle | G06F 1/329 |
| 9,921,639 B2 * | 3/2018 | Bose | G06F 1/329 |
| 10,127,596 B1 * | 11/2018 | Franke | G06Q 30/0631 |
| 10,162,543 B1 | 12/2018 | Patel et al. | |
| 10,228,966 B2 | 3/2019 | Pachlore et al. | |

(Continued)

OTHER PUBLICATIONS

Disclosed Anonymously, "System and Method to Automatically Hibernate/Resume Mobile Applications Based on User Location, User Behavior and Time", IPCOM000241526D; IP.com Prior Art Database, May 8, 2015, pp. 1-4.

(Continued)

*Primary Examiner* — Aurel Prifti
(74) *Attorney, Agent, or Firm* — Tutunjian & Bitetto, P.C.; Michael A. Petrocelli

(57) ABSTRACT

Tasks are selected for hibernation by recording user preferences for tasks having no penalty for hibernation and sleep; and assigning thresholds for battery power at which tasks are selected for a least one of hibernation and sleep. The assigning of the thresholds for battery power include considering current usage of hardware resources by a user and battery health per battery segment. A penalty score is determined for tasks based upon the user preferences for tasks having no penalty, and task performance including at least one of frequency of utilization, memory utilization, task dependency characteristics and task memory hierarchy. The penalty performance is a value including both the user preference and the task performance. Tasks can then be put into at least one of hibernation mode and sleep mode dictated by their penalty performance during the thresholds for battery power.

20 Claims, 8 Drawing Sheets

(56) References Cited

U.S. PATENT DOCUMENTS

| | | | |
|---|---|---|---|
| 10,884,475 B1* | 1/2021 | Wang | G06F 1/3296 |
| 11,086,389 B2* | 8/2021 | Hod | G06F 1/3275 |
| 11,210,171 B2* | 12/2021 | Gavrilov | G06F 11/1469 |
| 11,400,823 B1* | 8/2022 | Sampath | B60L 58/12 |
| 2006/0265712 A1* | 11/2006 | Zhou | G06F 40/143 |
| | | | 718/102 |
| 2008/0171599 A1* | 7/2008 | Salo | A63F 13/77 |
| | | | 463/41 |
| 2012/0210150 A1* | 8/2012 | de Lind van Wijngaarden | G06F 9/4893 |
| | | | 713/320 |
| 2012/0210325 A1* | 8/2012 | de Lind van Wijngaarden | H04W 52/0258 |
| | | | 718/103 |
| 2013/0042118 A1 | 2/2013 | Robben et al. | |
| 2013/0046964 A1* | 2/2013 | Dvoretzki | G06F 9/3861 |
| | | | 712/235 |
| 2013/0262891 A1* | 10/2013 | Gudlavenkatasiva | G06F 1/3212 |
| | | | 713/320 |
| 2014/0173617 A1* | 6/2014 | Cudak | G06F 1/3206 |
| | | | 718/104 |
| 2014/0229750 A1* | 8/2014 | Bhandaru | G06F 1/3203 |
| | | | 713/320 |
| 2015/0100964 A1* | 4/2015 | Na | G06F 9/5088 |
| | | | 718/102 |
| 2015/0277532 A1* | 10/2015 | Mishaeli | G06F 1/3206 |
| | | | 713/324 |
| 2015/0346800 A1* | 12/2015 | Kumar | G06F 1/3206 |
| | | | 713/323 |
| 2016/0054780 A1* | 2/2016 | Bodas | G06F 1/3234 |
| | | | 713/320 |
| 2016/0116971 A1* | 4/2016 | Luan | G06F 1/3287 |
| | | | 713/323 |
| 2016/0231801 A1* | 8/2016 | Chandra | G06F 1/3287 |
| 2016/0357232 A1* | 12/2016 | Kalyanasundaram | G06F 1/3296 |
| 2017/0308148 A1* | 10/2017 | Soliman | G06F 1/3296 |
| 2017/0329628 A1* | 11/2017 | Zhang | H04M 1/73 |
| 2018/0101214 A1* | 4/2018 | Mahindru | G06F 9/5094 |
| 2018/0329750 A1* | 11/2018 | Lin | G06F 9/5038 |
| 2022/0004166 A1* | 1/2022 | Saiki | G05B 19/4155 |
| 2022/0011842 A1 | 1/2022 | Reddy et al. | |
| 2022/0179585 A1* | 6/2022 | Muthiah | G06F 3/067 |
| 2024/0004707 A1* | 1/2024 | Wang | G06F 9/4893 |

OTHER PUBLICATIONS

International Search Report from PCT/EP2023/076383 dated Jan. 2, 2024. (12 pages).

\* cited by examiner

TABLE 1: DEPENDENT TASK TABLE

| TASKS | T4 | T7 | T9 |
|---|---|---|---|
| DEFAULT SCORE | 3 | 3 | 3 |
| # OF DEPENDENT TASK | 2 (T7, T9) | 1(T2) | 1(T5) |
| NORMALIZED DEPENDENT SCORE | 0.5 | 0.25 | 0.25 |
| DEPENDENT TASK SCORE | 2 | 4.5 | 4.5 |

FIG. 5

TABLE 2: SCORES ASSOCIATED WITH TASKS

| TASKS | FREQUENCY OF UTILIZATION | MEMORY OF USE SCORE | DEPENDENT TASK SCORE | EASE TO RESTORE SCORE |
|---|---|---|---|---|
| T1 | 1 | 10 | 10 | 3 |
| T2 | 6 | 2 | 10 | 6 |
| T3 | 2 | 7 | 10 | 2 |
| T4 | 10 | 8 | 2 (T7, T9) | 9 |
| T5 | 5 | 3 | 10 | 10 |
| T6 | 4 | 5 | 19 | 1 |
| T7 | 9 | 4 | 4.5 | 8 |
| T8 | 3 | 1 | 10 | 5 |
| T9 | 8 | 6 | 4.5 (T5) | 7 |

FIG. 6

TABLE 3: PENALTIES ASSOCIATED WITH TASKS

| TASKS | PENALTY OF UTILIZATION | MEMORY USED PENALTY | DEPENDENT TASK PENALTY | EASE TO RESTORE PENALTY | TOTAL PENALTY |
|---|---|---|---|---|---|
| T1 | 13.5 | 14 | 13 | 8.4 | 49 |
| T2 | 6 | 3 | 13 | 4.8 | 27 |
| T3 | 12 | 10 | 13 | 9.6 | 44 |
| T4 | 0 | 11 | 2.6 | 1.2 | 15 |
| T5 | 7.5 | 4 | 13 | 0 | 25 |
| T6 | 9 | 7 | 13 | 10.8 | 40 |
| T7 | 1.5 | 6 | 5.85 | 2.4 | 15 |
| T8 | 10.5 | 1 | 13 | 6 | 31 |
| T9 | 3 | 8 | 5.85 | 3.6 | 21 |

FIG. 7

HIBERNATION OF COMPUTING DEVICE WITH FAULTY BATTERIES

BACKGROUND

The present invention generally relates to computer battery management, and more particularly to battery management associated with hibernation processes of computing devices.

Hibernation is a mode in which a computer is turned off but saves its state to resume when it is turned on again. Hibernation is a process of migrating active process state from voltage storage to non-volatile storage. This is helpful in computing in resuming the processing on restore. Hibernation of the processes is used to effectively manage the computing device power consumption. Sleep mode, sometimes called standby or suspend mode, is a power-sparing state that a computer can enter when not in use. The computer's state is maintained in RAM (random access memory).

Sleep mode stores the documents and files you are operating into the RAM, using a small amount of power in the process. Hibernate mode essentially does the same thing, but saves the information to your hard disk, which allows your computer to be turned off completely and use no energy. Sleep mode will bring the process state to memory, which will resume faster than hibernation.

On critical battery conditions, instead of shutting down the computing device, hibernate or sleep modes would be a better choice, because the device can easily be rolled back to a previous active state.

SUMMARY

In accordance with an embodiment of the present invention, a computer-implemented method is provided for selecting tasks for hibernation on battery including computing devices. In one embodiment, the computer-implemented method includes recording user preferences for tasks having no penalty for hibernation and sleep. The method further includes assigning thresholds for battery power at which tasks are selected for a least one of hibernation and sleep. Assigning the thresholds for battery power can include considering current usage of hardware resources by a user and the battery health per battery segment. The computer implemented method can then determine a penalty score for tasks based upon the user preferences for tasks having no penalty, and task performance including at least one of frequency of utilization, memory utilization, task dependency characteristics and task memory hierarchy, wherein penalty performance is a value including both the user preference and the task performance. Tasks are then put into at least one of hibernation mode and sleep mode dictated by their penalty performance during the assigned thresholds for battery power.

In accordance with another embodiment of the present invention, a system is provided for selecting tasks for hibernation on battery including computing devices. In one embodiment, the system includes a hardware processor; and memory that stores a computer program product. The computer program product when executed by the hardware processor, causes the hardware processor to record user preferences for tasks having no penalty for hibernation and sleep, and assign thresholds for battery power at which tasks are selected for a least one of hibernation and sleep. Assigning the thresholds for battery power can include considering current usage of hardware resources by a user and the battery health per battery segment. The computer program product also employs the hardware processor to determine a penalty score for tasks based upon the user preferences for tasks having no penalty, and task performance including at least one of frequency of utilization, memory utilization, task dependency characteristics and task memory hierarchy. Penalty performance is a value including both the user preference and the task performance. The computer program product also employs the hardware processor to control tasks to be put into at least one of hibernation mode and sleep mode dictated by their penalty performance during the assigned thresholds for battery power.

In accordance with an embodiment of the present invention, a computer program product for selecting tasks for hibernation on battery including computing devices is provided that includes a computer readable storage medium having computer readable program code embodied therewith. The program instructions are executable by a processor. The program instructions cause the hardware processor to record user preferences for tasks having no penalty for hibernation and sleep, and assign thresholds for battery power at which tasks are selected for a least one of hibernation and sleep. Assigning the thresholds for battery power can include considering current usage of hardware resources by a user and the battery health per battery segment. The computer program product can also include instructions for the hardware processor to determine a penalty score for tasks based upon the user preferences for tasks having no penalty, and task performance including at least one of frequency of utilization, memory utilization, task dependency characteristics and task memory hierarchy. Penalty performance is a value including both the user preference and the task performance. The computer program product also employs the hardware processor to control tasks to be put into at least one of hibernation mode and sleep mode dictated by their penalty performance during the assigned thresholds for battery power.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 illustrates a table for one example of tasks having penalties assigned for dependency upon other tasks.

FIG. 6 illustrates a table for one example tasks having a summation of scores for the totality of tasks being monitored for sleep and/or hibernation.

FIG. 7 illustrates a table for one example of tasks having a summation of penalties for the totality of tasks being monitored for sleep and/or hibernation.

DETAILED DESCRIPTION

The methods, systems and computer program products described herein are directed to intelligent hibernation of computing devices with faulty batteries. Forceful hibernation on critical battery condition is a regular practice and in general the hibernation process is initiated very close to complete battery drain. Although existing power management systems consider hibernating/sleep of jobs to save battery consumption, they do not consider damaged battery segments and provide a unified experience to different devices and different usage patterns. What is needed is an intelligent way to choose the point and method of hibernation based on the computing device usage rather than waiting for the battery to drain out. It has been determined that a system is needed, which can save battery power providing utmost user satisfaction and provide unified experience for different devices and usage patterns. Part of this methodology is assigning thresholds for battery power and then controlling tasks when the thresholds are met. Thresholds may be established considering the battery segment health and the current resource usage of the users. Battery segment health can consider the age and condition of a battery. For example, an older battery can include segments that discharge their power much faster than newer batteries. Turning to the current resource usage of the users, some applications can employ greater hardware usage, e.g., hardware processor and memory, than other resources. For example, gaming on computer with high graphics requirements can use greater resources than a device that is being used for general Internet browsing. Assigning thresholds using the above methodology can save battery power providing utmost user satisfaction and provide unified experience for different devices and usage patterns.

This disclosure is attempting to provide an approach where the processes are intelligently hibernated and total battery consumption is efficiently utilized.

The methods, systems and computer program products are now described in greater detail with reference to FIGS. 1-9.

Figure 1:
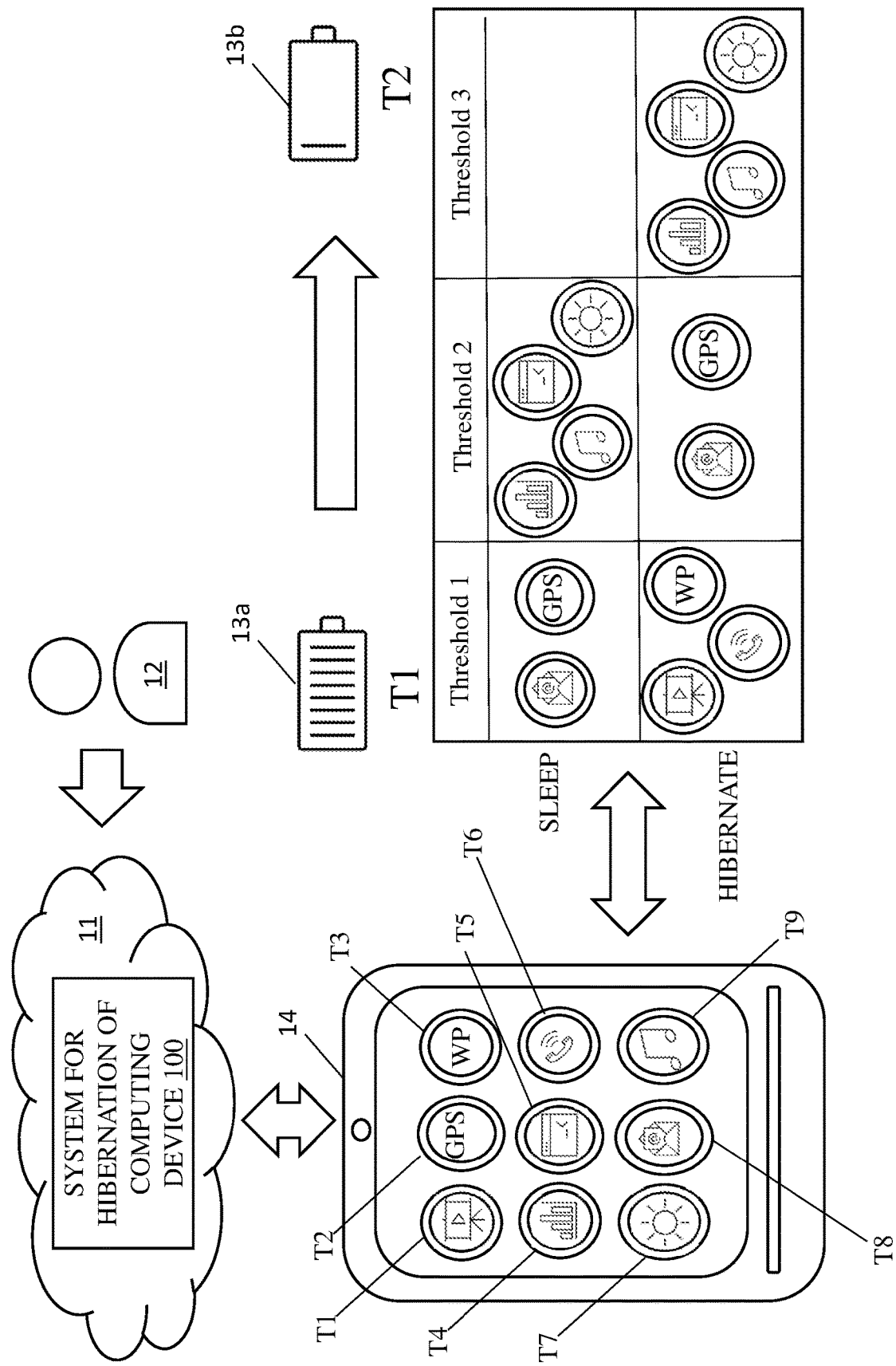
FIG. 1 is an illustration of an example environment/application for the system for intelligent hibernation of computing devices with faulty batteries.
Figure 2:
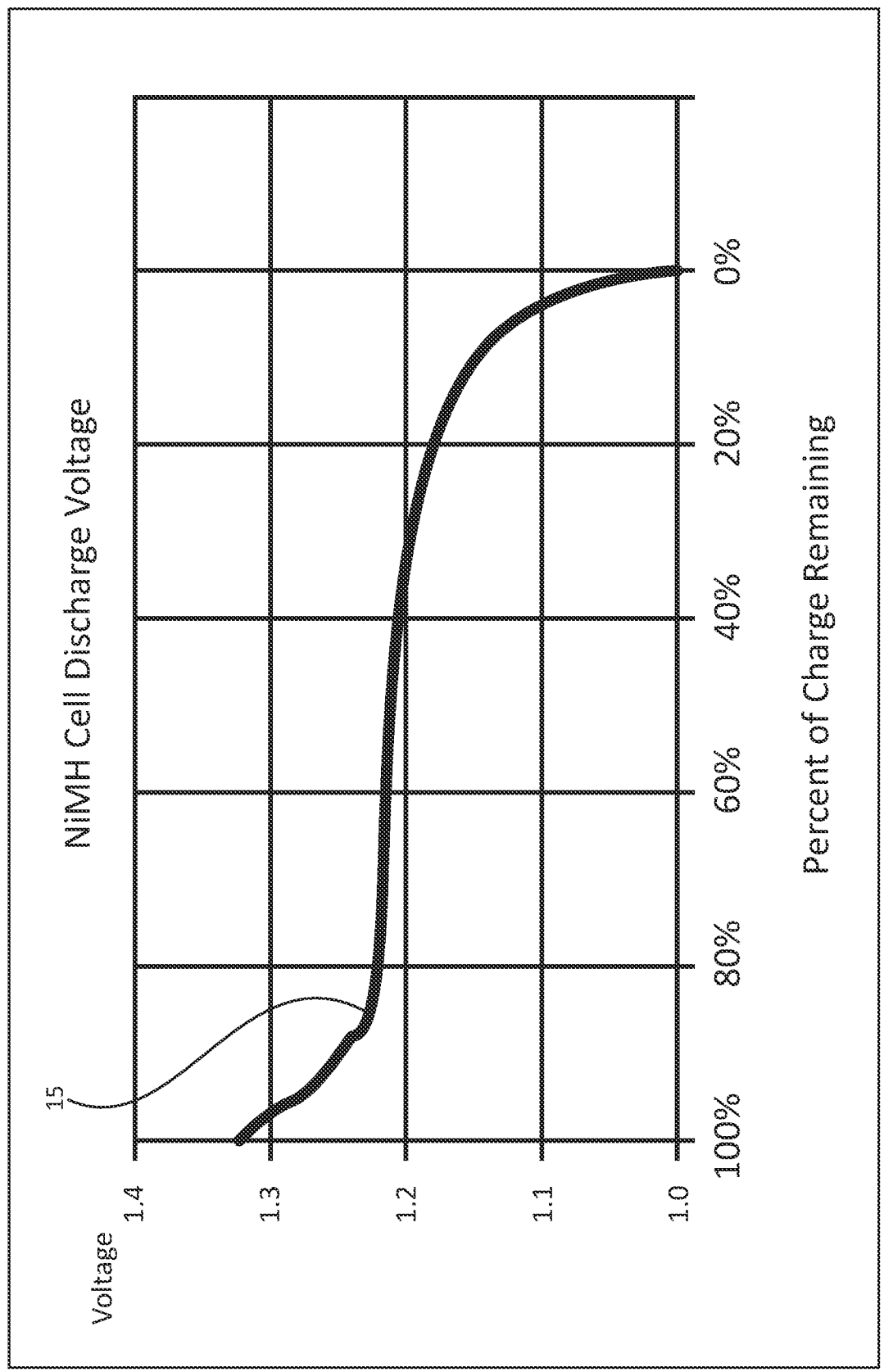
FIG. 2 illustrates one embodiment of an exemplary plot of battery cell discharge voltage as employed in the operation of batteries for computing systems.
Figure 3:
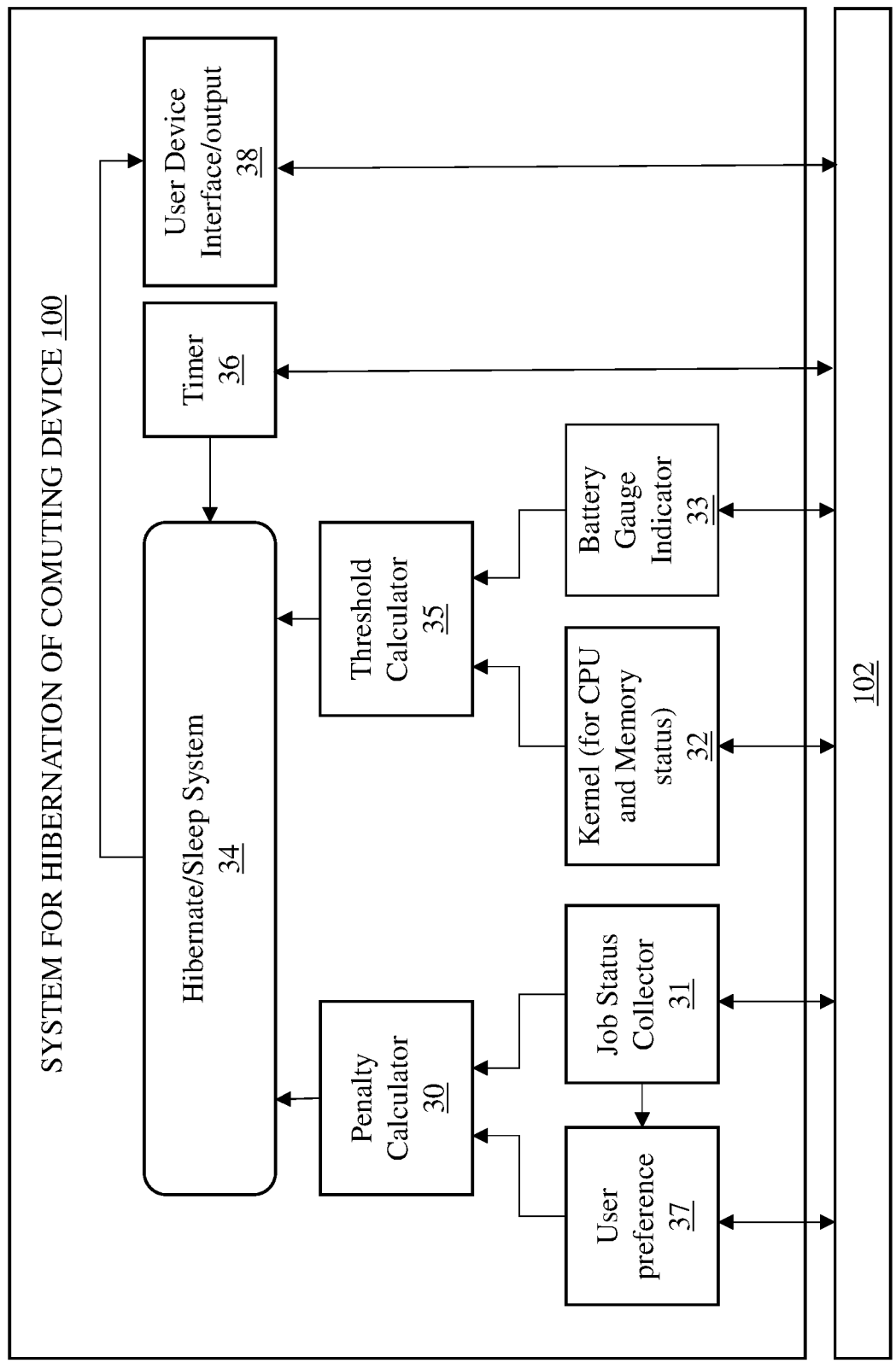
FIG. 3 is a flow chart/block diagram for one embodiment of a system for intelligent hibernation of computing devices with faulty batteries, in accordance with one embodiment of the present disclosure.
Figure 4:
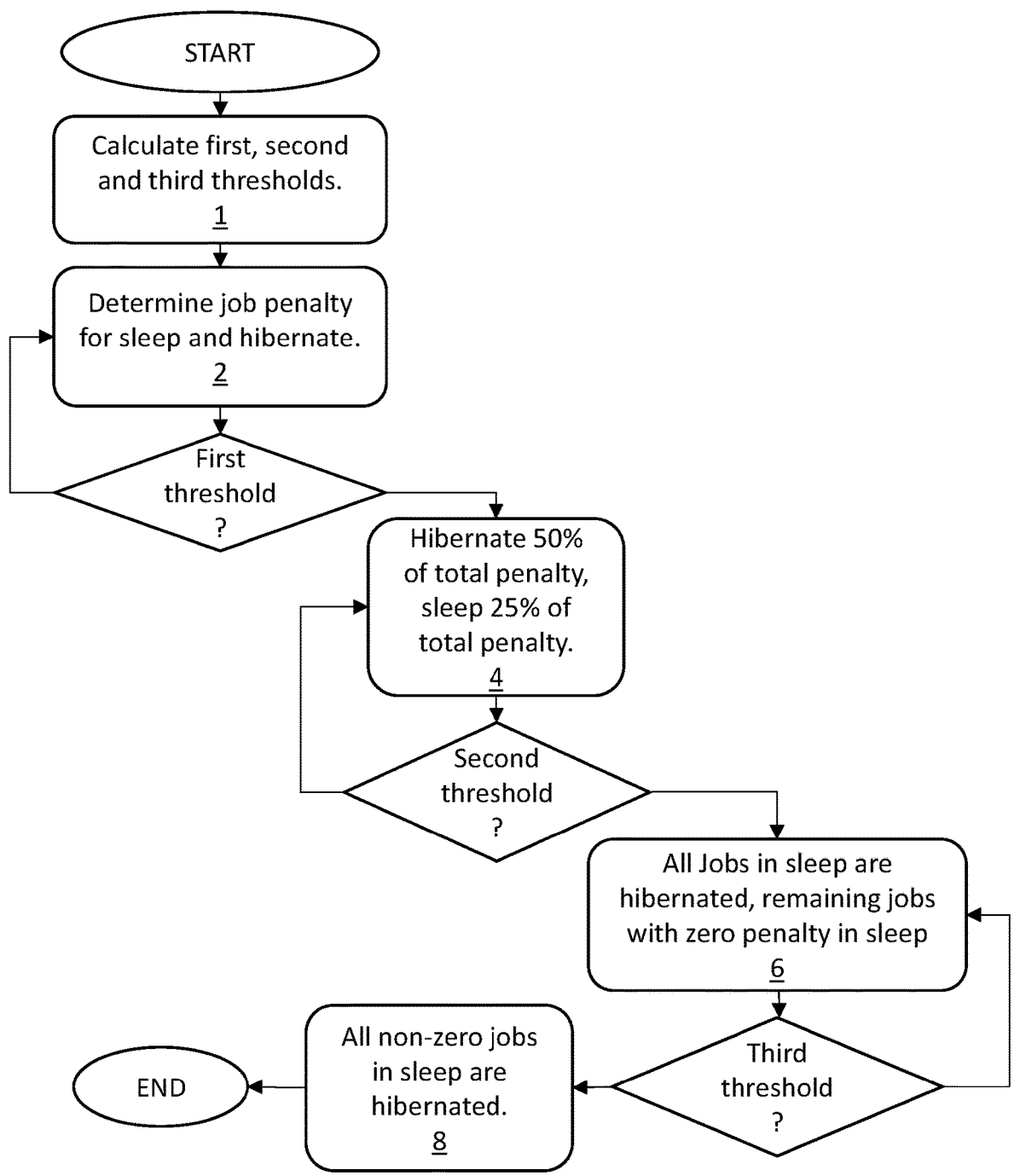
FIG. 4 is a flow chart/block diagram for a computer implemented method that provides for intelligent hibernation of computing devices with faulty batteries, in accordance with one embodiment of the present disclosure.

FIG. 1 illustrates an example environment/application for the system for intelligent hibernation of computing devices with faulty batteries. FIG. 2 illustrates one embodiment of an exemplary plot of battery cell discharge voltage as employed in the operation of batteries for computing systems. FIG. 3 illustrates one embodiment of a system for intelligent hibernation of computing devices with faulty batteries. FIG. 4 illustrates one embodiment of a flow chart/block diagram for a computer implemented method that provides for intelligent hibernation of computing devices with faulty batteries.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates an example environment by which the system 100 for intelligent hibernation of computing devices works with computing devices to select applications for hibernation and/or sleep. The hibernation system 100 may be cloud based 11. The user 12 may interact with the system for intelligent hibernation 100 of computing devices to identify preferences for what tasks (e.g., tasks having reference numbers T1, T2, T3, T4, T5, T6, T7, T8 and T9) they would prefer are not put into hibernation and/or sleep mode as the battery 13a, 13b for the computer device 14. The system for intelligent hibernation 100 of computing devices can select tasks for hibernation/sleep based on penalties assigned to the tasks based upon the frequency of utilization, current memory utilization, dependencies on other jobs and presence in memory hierarchy (ease to restore). This also takes into account the user preferences originally entered into the system. As battery power reduces from full capacity 13a to low capacity 13b, the system 100 puts the tasks to sleep and/or hibernation during thresholds, e.g., threshold 1, threshold 2, and threshold 3, according the user preferences and penalties assigned by the hibernation system 100.

FIG. 2 illustrates one example of how a typical battery voltage is consumed. FIG. 2 the curve 15 depicted in FIG. 2 illustrates one example of the time taken for a battery to discharge from 100% to 0%. This data is generally recorded by a battery monitoring chip, e.g., battery fuel gauge, which acts as an interface between the battery and the computing device. The battery monitoring chip can continually monitor the voltage and current supplied by the battery.

FIG. 2 illustrates a battery producing a voltage of 1.34V. This state of the battery is called 100%. Producing a voltage of 1V is considered as 0%. In this example, 1V is the minimum voltage needed for the computing device to work. The battery monitor chip makes the assumption that the total capacity of the battery does not change much between each charge and discharge cycle. Therefore, by keeping track of the amount of voltage used for each discharge, it's easy to calculate how much time is remaining. If at all a battery is in damaged condition, the graph illustrated in FIG. 2 will be steeply decline. This causes an aggressive reduction in performance levels, ex: battery aggressively dropping down from 30% to 0%. Historic data will also be evident in identifying such battery percentage segments, i.e., battery damage segments.

In some embodiments, the methods and systems of the present disclosure improve battery utilization by applying hibernate/sleep processes based on the idleness of the processes by considering a dynamic penalty-based approach and rate of change of battery utilization.

FIG. 3 is a flow chart/block diagram for one embodiment of a system 100 for intelligent hibernation of computing devices with faulty batteries. The system 100 includes a user preference 37 interface. The user preference interface is the mechanism by which the user 12 can identify to the system which tasks that the user does not want for selection in hibernation and sleep modes. These tasks are referred to as zero penalty tasks. The terms tasks and job are interchangeable throughout the present disclosure, as they both refer to some application that may include computer computation and may require the utilization of battery power to provide their function.

The system 100 for intelligent hibernation of computing devices with faulty batteries can include a penalty calculator 30. The penalty calculator 30 implements an algorithm that assigns jobs with penalties based on as great as four points. For example, the penalty calculator 30 may consider the frequency of utilization. Considering the frequency of utilization the penalty calculator 30 may increase the penalty as the frequency of the process is decreased. The frequency of utilization can be the first point by which the penalty calculator 30 can calculate penalties. A second point can be memory utilization. When a process has an increased memory utilization, the penalty for that process that is calculated by the penalty calculator increases. A third point that is considered by the penalty calculator 30 in calculating a penalty is the dependency of a process on other jobs (e.g., other processes). For example, spell check is a job that is a dependent job when a word processing document is being edited. The penalty calculated based upon job dependency increase as dependent jobs decrease. The dependent jobs memory of utilization can also impact the penalty of a job being calculated by the penalty calculator 30. A fourth point that is considered by the penalty calculator 30 is the ease to restore a job and/or process. For example, jobs in higher levels of cache are easier to restore. The penalty increases as the ease to restore decrease. In some embodiments, an additional base penalty will be induced to jobs in each of the points described above for calculating penalties. The base penalty will decrease as the points progress. A fifth point can be a zero penalty user preference job list. These are the tasks that are considered zero penalty tasks.

The system 100 for intelligent hibernation of computing devices with faulty batteries further includes a job status collector 31. The job status collector 31 collects the status of jobs at separate slab levels. "Slab levels" are how battery life for jobs being processes is characterized. For example, battery life may be characterized in slabs, such as 1) 100%-61% battery life, 2) 60% to 46% battery life, 3) 45% to 31% battery life, 4) 30% to 16% battery life, and 5) 15% to 0% battery life. At each slab level, certain jobs are assigned with different penalties by the penalty calculator 30. Some slabs have a zero penalty level, characterized as zero penalty level jobs. The slabs having a zero penalty level are not considered for hibernation. The number of jobs in the zero penalty jobs list 31, which is recorded by the jobs status collector 31, decreases as the number of slabs progress towards 0%. If the battery life is running out, the likelihood of jobs not needing hibernation/sleep is reduced. Similarly, certain amounts of CPU frequency cycles can always be available to address the zero penalty jobs that are not considered for hibernation/sleep. The kernel 32 is a computer program at the core of a computer's operating system, which facilitates interactions between hardware and software components. In this example, the kernel 32 provides the CPU frequency cycles to the job status collector 31 for consideration of how to address zero penalty jobs, i.e., jobs not needing hibernation/sleep mode.

Still referring to FIG. 3, the system 100 for intelligent hibernation of computing devices with faulty batteries further includes a hibernation/sleep system 34. The hibernation/sleep system 34 considers the penalties that are calculated by the penalty calculator 30 for the jobs that have been identified by the job status collector 31 as not being eliminated for the possibility for hibernation/sleep, and compares the penalty to thresholds for determining whether a job is to be selected for hibernation/sleep in the current battery slab. The hibernation/sleep system 34 also considers the preferences of the user 12, e.g., the existence of zero penalty tasks.

The thresholds are set by a threshold calculator 35. The threshold calculator 35 begins with the battery life categories, such as the battery life being characterized in slabs, such as 1) 100%-61% battery life, 2) 60% to 46% battery life, 3) 45% to 31% battery life, 4) 30% to 16% battery life, and 5) 15% to 0% battery life. The threshold calculator 35 sets the idle start to the battery percentage from when the device is at idle. A computer processor is described as "idle" when it is not being used by any program. Every program or task that runs on a computer system occupies a certain amount of processing time on the CPU. If the CPU has completed all tasks it is idle. Modern processors use idle time to save power. "Idle start" is the time when the computer enters the idle state. Idle start is reset on every change from an active to inactive stage change.

In consideration of the above, the thresholds are set by the threshold calculator 35 using equation (1), as follows:

$$\text{Base threshold} = \text{Total time left}(x)/\text{dynamic quotient}(y) \quad (1)$$

The variable "total time left (x)" is the time left to complete battery drain.

The variable "dynamic quotient (y)" is the Delta (i.e., time/percentage)*Slab-Constant (i.e., percentage). The Delta is the rate of change of time per battery percentage. The Slab-constant is equal to the Default-Slab-Percent+ (((Battery-damage-segment-finishi−Battery-damage-segment-starti)*Default-Slab-Percent)/100). The Default-Slab-Percent is an increasing percentage per slab progression. From the above relationships, the first threshold (FT), second threshold (ST) and third threshold (TT) can be calculated, as follows:

$$\text{Total time to battery lift} = 7x/4y(FT+ST+TT=x/y+x/2y+x/4y) \quad (2)$$

In which the First threshold (FT) is equal to the Base threshold, and the Second threshold (ST) and Third threshold (TT) are calculated from the following relationships:

$$\text{Second threshold (ST)} = 0.5*\text{Base threshold} \quad (3)$$

$$\text{Third threshold (TT)} = 0.25*\text{Base threshold}. \quad (4)$$

From equations (1)-(4), the first, second and third thresholds can be calculated. Thresholds may be established considering the battery segment health (battery-damage-segment-finishi−Battery-damage-segment-starti) and the current resource usage of the users. Battery segment health can consider the age and condition of a battery. For example, an older battery can include segments that discharge their power much faster than newer batteries.

The current resource usage of the users, some applications can employ greater hardware usage, e.g., hardware processor and memory, than other resources. For example, gaming on computer with high graphics requirements can use greater resources than a device that is being used for general internet browsing. Assigning thresholds using the considering both the battery segment health and the current state of resource usage by the users can save battery power providing a unified experience for different devices and usage patterns.

The processes are selected for hibernation/sleep according to the thresholds by the hibernation/sleep system 34.

For example, for the first threshold, jobs with 50% of the total penalty will be hibernated and the jobs will be selected based on the penalty (higher penalty job is considered over lower penalty job). Jobs with next 25% of the penalty will be put on sleep. Certain amount of CPU frequency will also be throttled to save power consumption by CPU.

For the second threshold, all the jobs in sleep are hibernated, remaining jobs with non-zero penalty are put on sleep. Certain amount of CPU frequency will also be throttled to save power consumption by CPU.

For the third threshold, all the jobs in sleep are hibernated. In some embodiments, a certain amount of CPU frequency will also be throttled to save power consumption by CPU.

The system 100 depicted in FIG. 3 also includes a timer 36, as well as an interface 37. The timer 36 can time battery and computer usage. The interface 37 provides that the user will have the preference to choose the jobs selectively/periodically to prioritize the jobs to be left to put in sleep/hibernate. These jobs will be reduced as the battery consumption progresses.

Still referring to FIG. 3, the hibernation/sleep system 34 may also include a User Device Interface/output 38, which provides for connectivity of the mobile devices 14 running the tasks and the 100 for intelligent hibernation of computing devices with faulty batteries. Through this interface the system 100 can provides instructions regarding what jobs/tasks can be put to sleep/hibernation at the different thresholds. It is further noted that the system 100 includes a bus 102 for incorporation into a larger system, such as that depicted in FIG. 8.

FIG. 4 is a computer implemented method that provides for intelligent hibernation of computing devices with faulty batteries. The method depicted in FIG. 4 may begin with block 1. Block 1 includes calculating a first, second and third threshold. The thresholds may be calculated by the threshold calculator 35 of the system 100 for intelligent hibernation of computing devices with faulty batteries. As described above, the inputs for calculating the thresholds can include the "total time left (x)", which is the time left to complete battery drain, and the rate of change of time per battery percentage (referred to as the Delta). Another input for calculating the thresholds may be the slab constant. The slab constant is calculated based on the default slab percent and the battery damages segments in the given slab. The above described inputs are used to calculate the first, second and third thresholds at block 1 using equations (1)-(4), as described for the threshold calculator of FIG. 3.

At block 2, the method may continue with determining the job penalty for activating a sleep/hibernation mode. Block 2 of FIG. 4 may determine penalty using at least 4 factors. In the example depicted in FIG. 4, the penalty is calculating according to 5 factors. The 5 factors can include (1) frequency of utilization, (2) memory utilization, (3) dependency of a job on another job, (4) ease to restore a job and/or process, and (5) preferences of a user for zero penalty jobs. A zero penalty job is one that is not considered for hibernation/sleep. As noted, the user 12 can enter tasks that they wish to not go into hibernation and sleep modes.

At block 3 of FIG. 4, the method can continue with determining whether the first threshold has been reached for the current slab.

If the first threshold is not met at block 3, the method cycles back to block 2 for the next slab, and the determination of meeting the first threshold is again considered at block 3.

For meeting the first threshold at block 3, the method continues to block 4. At block 4 jobs with 50% of the total penalty will be hibernated and the jobs will be selected based on the penalty (higher penalty job is considered over lower penalty job). Jobs with next 25% of the penalty will be put on sleep. Certain amount of CPU frequency will also be throttled to save power consumption by CPU.

At block 5, the method can continue with determining whether the second threshold has been reached for the current slab.

If the second threshold is not met at block 5, the method cycles back to block 4 for the next slab, and the determination of meeting the second threshold is again considered at block 5.

For meeting the first threshold at block 5, the method continues to block 6. At block 6, all the jobs in sleep are hibernated, remaining jobs with non-zero penalty are put on sleep. Certain amount of CPU frequency will also be throttled to save power consumption by CPU.

At block 7, the method can continue with determining whether the third threshold has been reached for the current slab.

If the third threshold is not met at block 7, the method cycles back to block 6 for the next slab, and the determination of meeting the second threshold is again considered at block 7.

For meeting the first threshold at block 7, the method continues to block 8.

At block 8, for the third threshold, all the jobs in sleep are hibernated. In some embodiments, a certain amount of CPU frequency will also be throttled to save power consumption by CPU.

This represents the end of one embodiment of the computer implemented method that is depicted in FIG. 4.

FIGS. 5-7 illustrate tables of data used in one illustrative example of the computer implemented methods and systems for intelligent hibernation of computing devices with faulty batteries. The data in FIGS. 5-7 illustrates how penalties are calculated for 9 tasks, i.e., task one (T1), task two (T2), task three (T3), task four (T4), task five (T5), task six (T6), task seven (T7), task wight (T8) and task nine (T9). These tasks are also illustrated in FIG. 1. Penalty is calculated in this example from (1) frequency of utilization, (2) memory utilization, (3) dependency of a job on another job, and (4) ease to restore a job and/or process.

Calculating frequency of utilization score is a normalized score scaled from 1 to 10. In this example, 1 is a job/task that is least used and 10 being a job/task that is most used.

Calculating the memory used score includes a normalized score of average memory used for tasks scaled from 1 to 10. In this example, 1 is a value for tasks with the least memory used, and 10 is a value for tasks with the most memory used.

In one example, calculating dependent task scores is considered of two main points. The first point can be whether a task has any dependent tasks. The second point can be the number of dependent tasks. This will reflect the user experience as the number of jobs killed is directly proportional to the job miss when the user gets active. In one example, calculating the dependent task scores includes assigning a score of 10 to all tasks that do not have any dependent tasks. The default score for each dependent task is a reduction in score of 3. Taking into account the default score for a task having no dependencies, and the reduction in score for a task for a dependency, the tasks can be marked with a scale of 1-10. Because a zero-penalty task is equal to 0, all tasks that are not zero penalty tasks in the example illustrates in FIGS. 5-7 have a default score of 3.

The tasks can be normalized based on the number of dependent tasks. This is illustrated in the Table titled Dependent Task Table in FIG. 5. In the example illustrate in FIG. 5, there are five tasks, e.g., T2, T4, T5, T7 and T9. In the example depicted in FIG. 5, the task identified as T4 has two dependencies, which are T7 and T9. In this example, the normalized dependency score is equal to the number of dependent task assigned to the task divided by the total number of dependent task. In the example depicted in FIG. 4, there are four dependent tasks, i.e., tasks that are dependent upon another. Those tasks are T2, T5, T7 and T9. The tasks that are actually dependent upon task 4, i.e., T4, are tasks T7 and T9, which is 2 dependent tasks. Therefore, for task T4, the normalized score is equal to 0.5, which is 4/2. Still referring to the T4 column of the Dependent Task Table in FIG. 5, using the normalized score a dependent task score can be calculated according to a value of 10 subtracting 10 multiplied by the normalized deposition score and subtracting the default score to reduce, which is equal to: (10−(10*normalized deps score)-default score to reduce). In the example, depicted in FIG. 5, because the default score to reduce is 3, the value for the dependent task score for the T4 task is equal to 2. Similar calculations are provided for T7 and T9, which both have dependent tasks. The remainder of the tasks have no dependencies, and therefore are scored as 10.

The example illustrated in the Tables included in FIGS. 5-7 also include an example of calculating ease of restore. In this example, ease of restore is a normalized score that is scaled from 1 to 10. A score of 1 illustrates a task that is easy to restore, whereas scores closer to the maximum of 10 are difficult to restore. The ease of restore score depends on page availability in the cache/ram closer to the computational unit. FIG. 6 illustrates not only the scoring for ease of restore, but also scoring for the frequency penalty (utilization penalty), the memory used penalty (memory utilization), and dependent task penalty.

FIG. 7 includes a table for the Penalties Associated with Tasks according to the example including tasks T1-T9. The total penalty for each task is first calculated, and the overall total penalty of the total penalty for each task is then calculated. In the Example illustrated in FIGS. 5-7, the overall total penalty is equal to 267. In this examples inputs for calculating penalties can include:

1. idle-start percentage at 80% which falls into a first category of slabs for battery power.
2. That there is no battery damage segment the first category of slabs for battery power.
3. The total time (x) left to battery drain from idle-start being equal to 200 minutes.
4. Delta=3 minutes/%.
5. Default-Slab-Percent=4%.

Using the above, the slab constant can be calculated, which in this example is 4%, as follows:

Slab-constant=Default-Slab-Percent+(((Battery-damage-segment-finish−Battery damage-segment-start)*Default-Slab-Percent)/100)=4+(0*4)/100=4%

In order to determine the first, second and third thresholds, using the total time (x) left to battery drain from idle-start being equal to 200 minutes and the slab constant, Y may be calculated. Y may be equal to 12 minutes, as calculated from the following equation:

Y=Delta(i.e., time/percentage)*Slab-Constant(i.e., percentage)=(3 minutes/1%)*4%

Following calculations of Y, and X, the first, second and third thresholds are calculated, as follows:
First threshold (FT)=X/Y=200/12=16.66 minutes
Second threshold (ST)=X/2Y=200/24=8.33 min
Third threshold (TT)=X/4Y=200/48=4.16 min Following the calculation of the thresholds, the penalties of the are then considered as tabulated in FIG. 7 to determine, which of the tasks can be selected for hibernation and/or sleep, i.e., jobs to kill.

For example, at the first threshold (FT), jobs (tasks) for hibernation may be high penalty tasks that in sum are equal to up to 50% of total penalty. For example, the total penalty from FIG. 7 is equal to 267. In this example, 50% of the total penalty is equal to 133.5. Still referring to FIG. 7, task 1 (T1), task 3 (T3) and task 6 (T6), having penalties of 49, 44 and 40, respectively, when totaled equal 133. Therefore, task 1 (T1), task 3 (T3) and task 6 (T6) are selected for hibernation, as illustrated in FIG. 1. Still considering the first threshold, the jobs (tasks) considered for sleep after the hibernated tasks, are the next high penalty tasks summating to 25% of total. In this example, 25% of the total penalty is equal to 66.75. Still referring to FIG. 7, task 8 (T8) and task 6 (T6), having penalties of 31 and 27, respectively, when totaled equal 58. Therefore, task 6 (T6) and task 8 (T8) are selected for sleep, at the first threshold (FT), as illustrated in FIG. 1.

For example, at the second threshold (ST), jobs for hibernation can include all the jobs (tasks), e.g., task 6 (T6) and task 8 (T8), that were selected for sleep at the first threshold (FT). Further, at the second threshold (ST), all the non-penalty (e.g., zero penalty) jobs (tasks) are put to sleep in the second threshold (ST). For example, referring to FIG. 7, in this instance task four (T4), task five (T5), task seven (T7) and task nine (T9) are all zero penalty jobs, and therefore are all put to sleep at the second threshold (ST), as illustrated in FIG. 1.

For example, at the third threshold (TT), all the jobs in sleep can then be hibernated, which in the example illustrated by FIG. 7 includes task four (T4), task five (T5), task seven (T7) and task nine (T9), which were all zero penalty jobs.

The above described methods and systems provide an intelligent way to choose the point and method of hibernation based on the computing device usage rather than waiting for the battery to drain out. This disclosure is attempting to provide an approach where the processes are intelligently hibernated and total battery consumption is efficiently utilized.

Core logic of improving the battery utilization is by hibernate/sleep the processes based on the idleness of the processes by considering a dynamic penalty-based approach and rate of change of battery utilization.

Proposed system is intended to increase the longevity of the battery charge cycle and making applications more available with phased hibernation process. It also aims to provide unified experience for device users with different battery conditions and usage patterns.

The proposed system is invoked upon user inactivity, and the flow of the system is interrupted to a force stop upon the user activity is noticed in the device. As the user is now active, all the jobs which were put on sleep/hibernate state will be restored back.

Jobs are put to sleep/hibernate in phased manner and the timer thresholds are calculated based on the following aspects: total time left to complete battery drain, current battery consumption rate and current battery slab and battery damage segments. The total time to sleep/hibernate (total of thresholds) will be decreasing as the battery consumption progresses. Jobs are penalized based on the frequency of utilization, current memory utilization, dependencies on other jobs and presence in memory hierarchy (ease to restore). A list of user preferences is also taken into consideration, among them dynamically a subset of jobs are chosen based on the current slab level, these chosen jobs will not be put on sleep/hibernate during the whole process.

Figure 8:
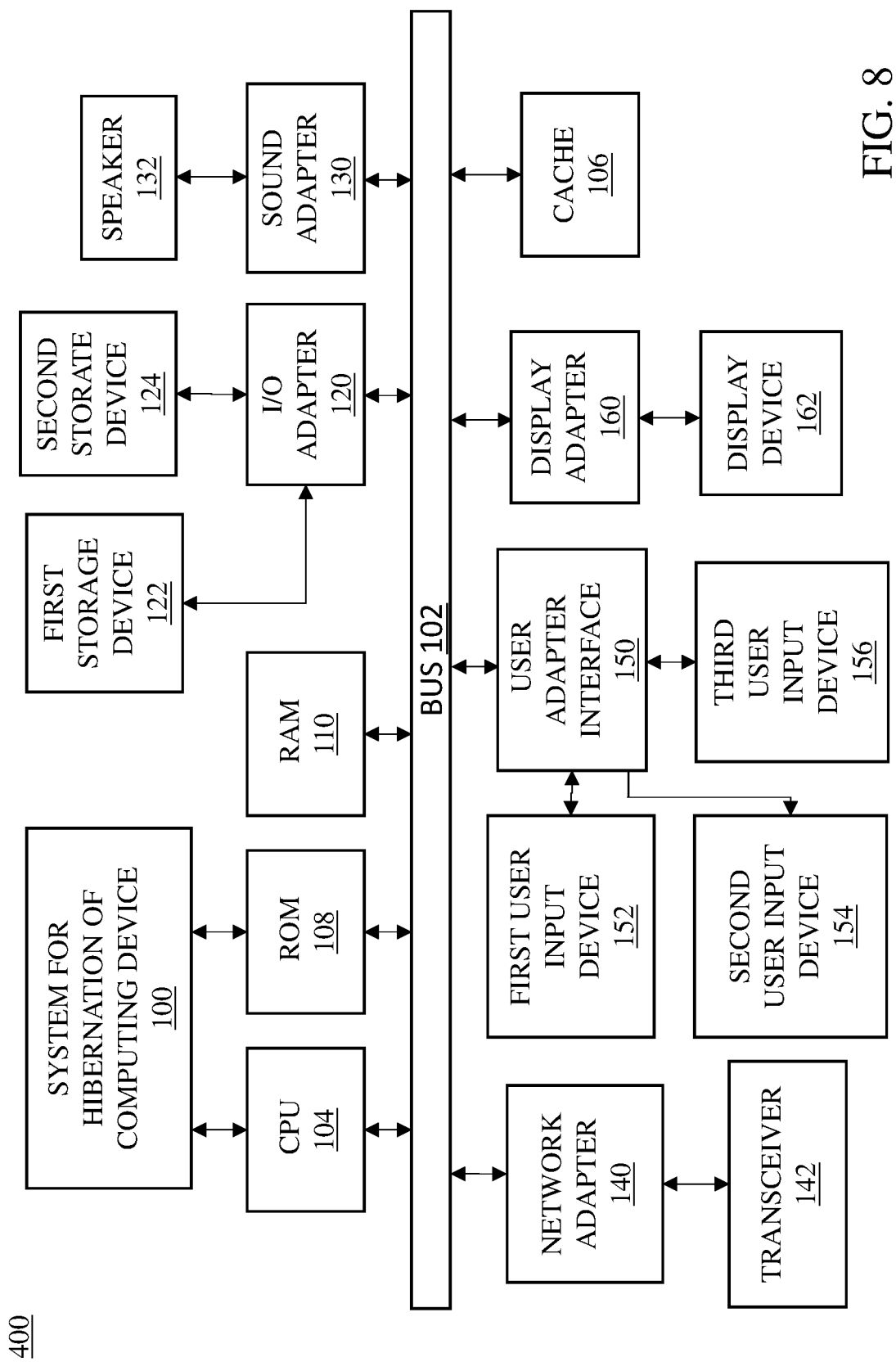
FIG. 8 is a block diagram illustrating a system that can incorporate the system for intelligent hibernation of computing devices with faulty batteries, that are depicted in FIG. 2, in accordance with one embodiment of the present disclosure.

FIG. 8 further illustrates a processing system 400 that can include the system 100 for managing hibernation and sleep of tasks in battery powered devices with reference to FIGS. 1-7. The exemplary processing system 400 to which the present invention may be applied is shown in accordance with one embodiment. The processing system 400 includes at least one processor (CPU) 104 operatively coupled to other components via a system bus 102. The system bus 102 may be in communication with the system for ranking materials for post combustion carbon capture 200. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for ranking materials for post combustion carbon capture. The computer program product may include a computer readable storage medium. The computer readable storage medium may have computer readable program code embodied therewith, the program instructions executable by a processor to cause the processor to characterize, using the processor, sorbent materials with a molecular model workflow 26 that generates microscopic figures of merit for materials by microscopic properties; and evaluate, using the processor, the materials from the molecular model workflow with a process model workflow 27 that generates macroscopic figures of merit for process steps of a carbon recovery process. The computer readable storage medium also includes instructions that can rank (with the combined microscopic performance and macroscopic process feasibility generator 29), using the processor, the materials for applicability as a sorbent material using a combined microscopic performance and macroscopic process feasibility generator that ranks the materials according to the microscopic figures of merit for materials and the macroscopic figures of merit for the process steps.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
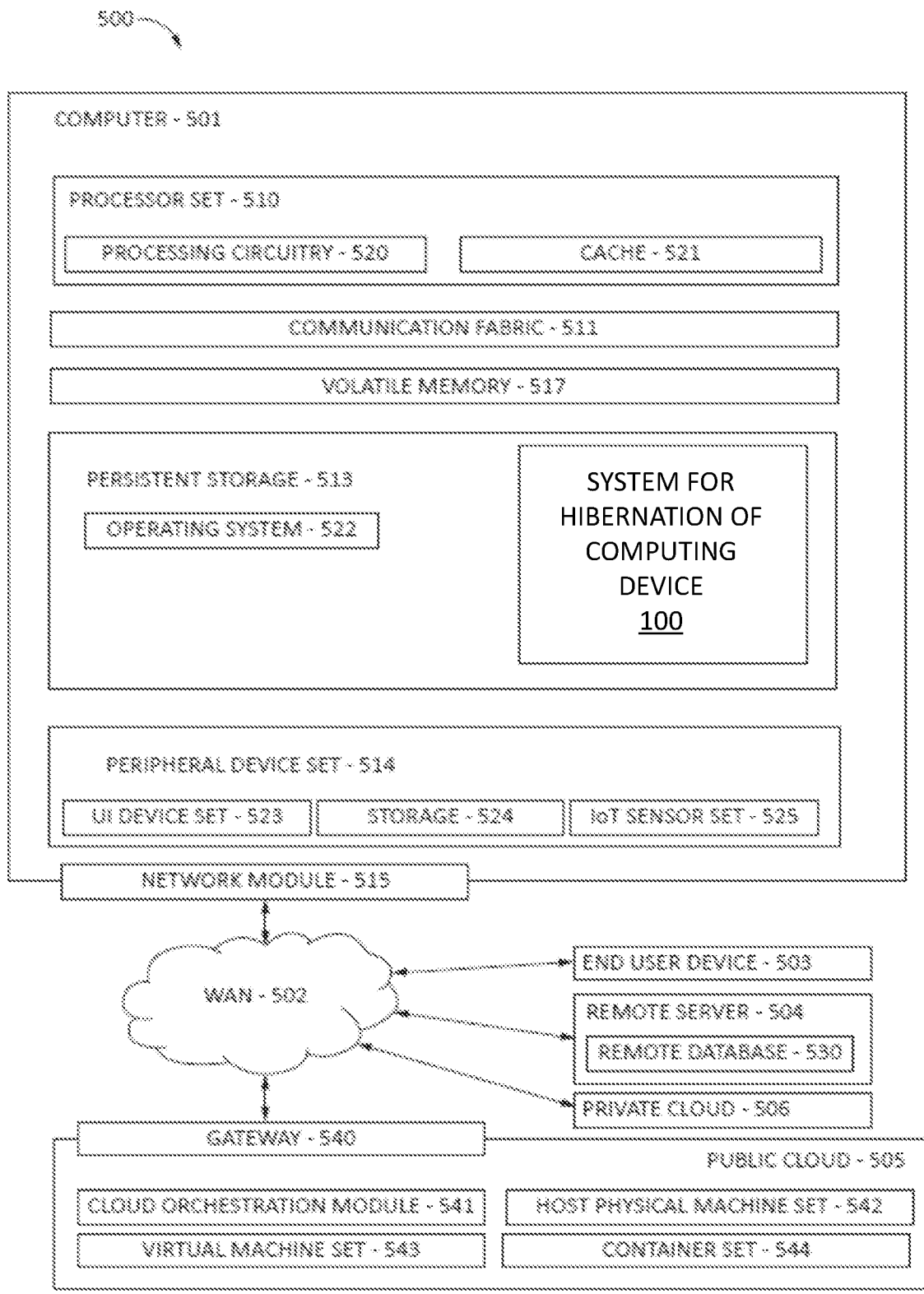
FIG. 9 depicts a computing environment according to an embodiment of the present disclosure.

Referring to FIG. 9, the computing environment 500 contains an example of an environment for the execution of at least some of the computer code involved in performing the inventive methods, such as the method for ranking materials for post combustion carbon capture 200. In addition to block 200, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 200, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible.

Computer 501 may be located in a cloud, even though it is not shown in a cloud in FIG. 9. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 200 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 101 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 101 to communicate with other computers through WAN 102. Network module 515 may include hardware, such as modems or Wi-Fi signal transceivers, software for packetizing and/or de-packetizing data for communication network transmission, and/or web browser software for communicating data over the Internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515. WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of intelligent hibernation of computing devices with faulty batteries (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A computer implemented method for selecting tasks for hibernation on battery including computing devices comprising:
    recording user preferences for tasks having no penalty for hibernation and sleep;
    assigning thresholds for battery power at which tasks are selected for a least one of hibernation and sleep, wherein the assigning of the thresholds for battery power includes considering current usage of hardware resources by a user and battery health per battery segment;
    determining a penalty score for tasks based upon the user preferences for tasks having no penalty, and task performance including at least one of frequency of utilization, memory utilization, task dependency characteristics and task memory hierarchy, wherein penalty performance is a value including both the user preference and the task performance; and
    controlling tasks to be put into at least one of hibernation mode and sleep mode dictated by their penalty performance during the thresholds for battery power.

2. The computer implemented method of claim 1, wherein tasks have a default score and the penalty score is added to the default score for a total penalty score for the task.

3. The computer implemented method of claim 1, wherein during a first threshold a first set of tasks having a first penalty score are put into hibernation, and a second set of tasks having a second penalty score are put into sleep, wherein the first penalty score is higher than the second penalty score.

4. The computer implemented method of claim 3, wherein during a second threshold the second set of tasks that were put into sleep during the first threshold are put into hibernation.

5. The computer implemented method of claim 4, wherein during the second threshold at least one having no penalty is put into sleep.

6. The computer implemented method of claim 5, wherein during a third threshold, tasks that are in sleep during the second threshold are put into hibernation.

7. The computer implemented method of claim 1, wherein the thresholds are each a time corresponding to a reduction in battery power.

8. A system for selecting tasks for hibernation on battery including computing devices comprising:
    a hardware processor; and
    a memory that stores a computer program product, which, when executed by the hardware processor, causes the hardware processor to:
    record user preferences for tasks having no penalty for hibernation and sleep;
    assign thresholds for battery power at which tasks are selected for a least one of hibernation and sleep, wherein the assigning of the thresholds for battery power includes considering current usage of hardware resources by a user and battery health per battery segment;
    determine a penalty score for tasks based upon the user preferences for tasks having no penalty, and task performance including at least one of frequency of utilization, memory utilization, task dependency characteristics and task memory hierarchy, wherein penalty performance is a value including both the user preference and the task performance; and
    control tasks to be put into at least one of hibernation mode and sleep mode dictated by their penalty performance during the thresholds for battery power.

9. The system for selecting tasks for hibernation on battery including computing devices of claim 8, wherein tasks have a default score and the penalty score is added to the default score for a total penalty score for the task.

10. The system for selecting tasks for hibernation on battery including computing devices of claim 9, wherein during a first threshold a first set of tasks having a first penalty score are put into hibernation, and a second set of tasks having a second penalty score are put into sleep, wherein the first penalty score is higher than the second penalty score.

11. The system for selecting tasks for hibernation on battery including computing devices of claim 10, wherein during a second threshold the second set of tasks that were put into sleep during the first threshold are put into hibernation.

12. The system for selecting tasks for hibernation on battery including computing devices of claim 10, wherein during the second threshold at least one having no penalty is put into sleep.

13. The system for selecting tasks for hibernation on battery including computing devices of claim 10, wherein during a third threshold, tasks that are in sleep during the second threshold are put into hibernation.

14. The system for selecting tasks for hibernation on battery including computing devices of claim 10, wherein during a third threshold, tasks that are in sleep during the second threshold are put into hibernation.

15. The system for selecting tasks for hibernation on battery including computing devices of claim 8, wherein the thresholds are each a time corresponding to a reduction in battery power.

16. A computer program product for selecting tasks for hibernation on battery including computing devices comprising a computer readable storage medium having computer readable program code embodied therewith, the program instructions executable by a processor to cause the processor to:
- record, using the processor, user preferences for tasks having no penalty for hibernation and sleep;
- assign, using the processor, thresholds for battery power at which tasks are selected for a least one of hibernation and sleep, wherein the assigning of the thresholds for battery power includes considering current usage of hardware resources by a user and battery health per battery segment;
- determine, using the processor, a penalty score for tasks based upon the user preferences for tasks having no penalty, and task performance including at least one of frequency of utilization, memory utilization, task dependency characteristics and task memory hierarchy, wherein penalty performance is a value including both the user preference and the task performance; and
- control tasks, using the processor, to be put into at least one of hibernation mode and sleep mode dictated by their penalty performance during the thresholds for battery power.

17. The computer program product of claim 16, wherein tasks have a default score and the penalty score is added to the default score for a total penalty score for the task.

18. The computer program product of claim 17, wherein during a first threshold a first set of tasks having a first penalty score are put into hibernation, and a second set of tasks having a second penalty score are put into sleep, wherein the first penalty score is higher than the second penalty score.

19. The computer program product of claim 18, wherein during a second threshold the second set of tasks that were put into sleep during the first threshold are put into hibernation.

20. The computer program product of claim 16, wherein during the second threshold at least one having no penalty is put into sleep.

* * * * *